United States Patent [19]
Lindgren et al.

[11] Patent Number: 5,435,895
[45] Date of Patent: Jul. 25, 1995

[54] ELECTROKINETIC ELECTRODE SYSTEM FOR EXTRACTION OF SOIL CONTAMINANTS FROM UNSATURATED SOILS

[75] Inventors: Eric R. Lindgren; Earl D. Mattson, both of Albuquerque, N. Mex.

[73] Assignee: Sandia Corporation, Albuquerque, N. Mex.

[21] Appl. No.: 283,233

[22] Filed: Jul. 29, 1994

[51] Int. Cl.⁶ .................... B01D 61/42; B01D 61/56
[52] U.S. Cl. ................ 204/182.2; 204/180.1; 588/204
[58] Field of Search ............ 204/182.2, 180.1; 588/204

[56] References Cited

U.S. PATENT DOCUMENTS

| | | | |
|---|---|---|---|
| 2,831,804 | 4/1958 | Collopy | 204/180 |
| 4,013,538 | 3/1977 | Schneider et al. | 204/280 |
| 4,367,132 | 1/1983 | Bell et al. | 204/180 |
| 4,382,341 | 5/1983 | Bell et al. | 34/1 |
| 5,074,986 | 12/1991 | Probstein et al. | 204/130 |
| 5,137,608 | 8/1992 | Acar et al. | 204/130 |

FOREIGN PATENT DOCUMENTS 312174  4/1989  European Pat. Off. .

OTHER PUBLICATIONS

Horng et al., "Evaluating Electro-kinetics as a Remedial Action Technique", Aug. 1987 pp. 65-77.

Primary Examiner—John Niebling
Assistant Examiner—Arun S. Phasge
Attorney, Agent, or Firm—George H. Libman

[57] ABSTRACT

There is presented an electrokinetic electrode assembly for use in extraction of soil contaminants from unsaturated soil in situ. The assembly includes a housing for retaining a liquid comprising an electrolyte solution, pure water, and soil water, the housing being in part of porous material capable of holding a vacuum. An electrode is mounted in the housing. The housing is provided with a vacuum orifice for effecting a vacuum within the housing selectively to control flow of soil water through the housing into the chamber and to control outflow of the liquid from the chamber. The assembly further includes conduit means for removing the liquid from the housing and returning the electrolyte solution to the housing, and a conduit for admitting pure water to the housing. There is further presented an electrode system and method for extraction of soil contaminants, the system and method utilizing at least two electrode assemblies as described above.

9 Claims, 5 Drawing Sheets

ELECTROKINETIC ELECTRODE SYSTEM FOR EXTRACTION OF SOIL CONTAMINANTS FROM UNSATURATED SOILS

The United States Government has rights in this invention pursuant to Contract No. DE-AC04-76DP00789, between the Department of Energy and American Telephone and Telegraph Company.

BACKGROUND OF THE INVENTION

1. Field of the Invention

This invention relates to extraction of contaminants from soil and is directed more particularly to in situ extraction of contaminants from unsaturated soil.

2. Description of the Prior Art

Heavy-metal contamination of soil and groundwater is a widespread problem in industrial nations. Large spills and leaks can contaminate both the soil above the water table and the aquifier itself. Smaller spills, or spills in arid regions with thick vadose zones, can result in a contaminant plume that totally resides in unsaturated soil. In both cases, there exists a contamination problem in the vadose zone in need of remediation. Excavation of such sites often are not cost effective or politically acceptable. Electrokinetic remediation is a technique utilized for in situ removal of such contaminants from soil.

To conduct electrokinetic remediation, electrodes are implanted in the ground and a direct current is imposed between the electrodes. The application of direct current leads to two effects; ionic species in the soil-water solution migrate (electromigration) to the oppositely charged electrode, and accompanying this migration, a bulk flow of soil-water is induced toward one of the anode and the cathode by electroosmosis, usually toward the cathode. The combination of these two phenomena leads to a movement of contaminant ions towards one or the other, or both, of the electrodes.

The direction and rate of contaminant movement is determined by a number of factors, among which are type and concentration of contaminant, soil type and structure, interfacial chemistry of the soil-water system, and the current density in the soil pore water. Contaminants arriving at the electrodes may potentially be removed from the soil by one of several known methods, including pumping out of the soil water having the contaminants therein.

The direction of water movement in the soil is determined by the electrical charge of the soil. In most instances, soil is negatively charged and water will move therethrough to the cathode. However, under some conditions, some soils may have a positive charge and the water therein will, upon actuation of an electric field, flow toward the anode.

The above method is suited to operate in a saturated zone. Pumping water from a well that contains an electrode appears to be the most common electrokinetic extraction method. However, unlike groundwater in saturated soil, pore water in a vadose zone is held under tension in the soil pores. This tension prevents the pore water in the vadose zone from flowing into extraction wells as it does in the saturated zone. Therefore, effluent extraction techniques at an electrode, proposed for saturated methods, are not applicable in the vadose zone.

In U.S. Pat. No. 5,074,986, issued Dec. 24, 1991 to Ronald F. Probstein, et al., there is disclosed a method for removing contaminant material from a soil site. In the Probstein process, electrodes are placed in the ground and an electrical potential is imposed between the electrodes, which induces an electrical current. A purge solution is introduced under pressure at the anode and electroosmotically passed through the soil, which displaces contamination into the cathode well. However, in unsaturated soils the purge solution is drawn into the soil at a rapid rate and can drain from the site before reaching the cathode well, carrying contaminants to new depths.

In U.S. Pat. No. 5,137,608, issued Aug. 11, 1992 to Yalcin B. Acar, et al., there is disclosed a process similar to the Probstein process and stated to be operative in saturated soils. In Acar, water is added to the soil at the anode and an acid front is produced by reactions at the anode, the acid front moving through the soil causing contaminant ions to be transported to the cathode. Again, the use of the Acar method in unsaturated soils could result in drainage of water, with consequent transportation of contaminants deeper into the ground.

While the procedures taught by Probstein et al., and Acar, et al., provide means and methods for removing contaminants from saturated soil, there remains a need for an electrokinetic remediation device, system, and method by which unsaturated soils can be cleansed of contaminants in situ without having to saturate the soil, which saturation carries concomitant risk of washing the contaminants deeper in the soil and/or outside of the treatment zone.

SUMMARY OF THE INVENTION

An object of the invention is, therefore, to provide an electrokinetic electrode assembly for use in extraction of soil contaminants from unsaturated soil in situ.

A Further object of the invention is to provide such an assembly adapted to be placed under a selected vacuum for control of flow of soil water into the assembly and control of outflow of water from the assembly.

A further object of the invention is to provide an electrokinetic electrode system for extraction or soil contaminants from unsaturated soil in situ, the system typically including at least two of the aforesaid assemblies.

A further object of the invention is to provide such a system in which each of the assemblies is provided with a discrete and independent vacuum system, such that vacuum levels may be individually selected for each assembly to control water flow between assemblies in the system.

A still further object of the invention is to provide a method for in situ removal of contaminants from unsaturated soil, the method utilizing the aforesaid assemblies and system.

With the above and other objects in view, as will hereinafter appear, a feature of the present invention is the provision of an electrokinetic electrode assembly for use in extraction of soil contaminants from unsaturated soil in situ, the assembly comprising a substantially closed housing comprising an upper well casing of non-electrically conductive water-impervious material and a lower casing of porous material fixed together to define a chamber for retaining an electrolyte solution and water, and an electrode disposed at least partly in the lower casing. The upper casing has therein a means for effecting a vacuum within the chamber selectively to control flow of soil water through the lower casing into the chamber and to control outflow of liquid from the chamber, means for admitting pure water to the housing, conduit means for removing the liquid comprising pure water, soil water, and the electrolyte solution, from the chamber and for reintroducing the electrolyte solution to the chamber after treatment of the solution. A pump is provided for moving the liquid through the conduit means. A power line is provided for placing the electrode in communication with a power source.

The above and other features of the invention, including various novel details of construction and combinations of parts, will now be more particularly described with reference to the accompanying drawings and pointed out in the claims. It will be understood that the particular device, system and method embodying the invention are shown by way of illustration only and not as limitations of the invention. The principles and features of this invention may be employed in various and numerous embodiments with out departing from the scope of the invention.

BRIEF DESCRIPTION OF THE DRAWINGS

Reference is made to the accompanying drawings in which are shown illustrative embodiments of the invention, from which its novel features and advantages will be apparent.

DESCRIPTION OF THE PREFERRED EMBODIMENTS

Figure 1:
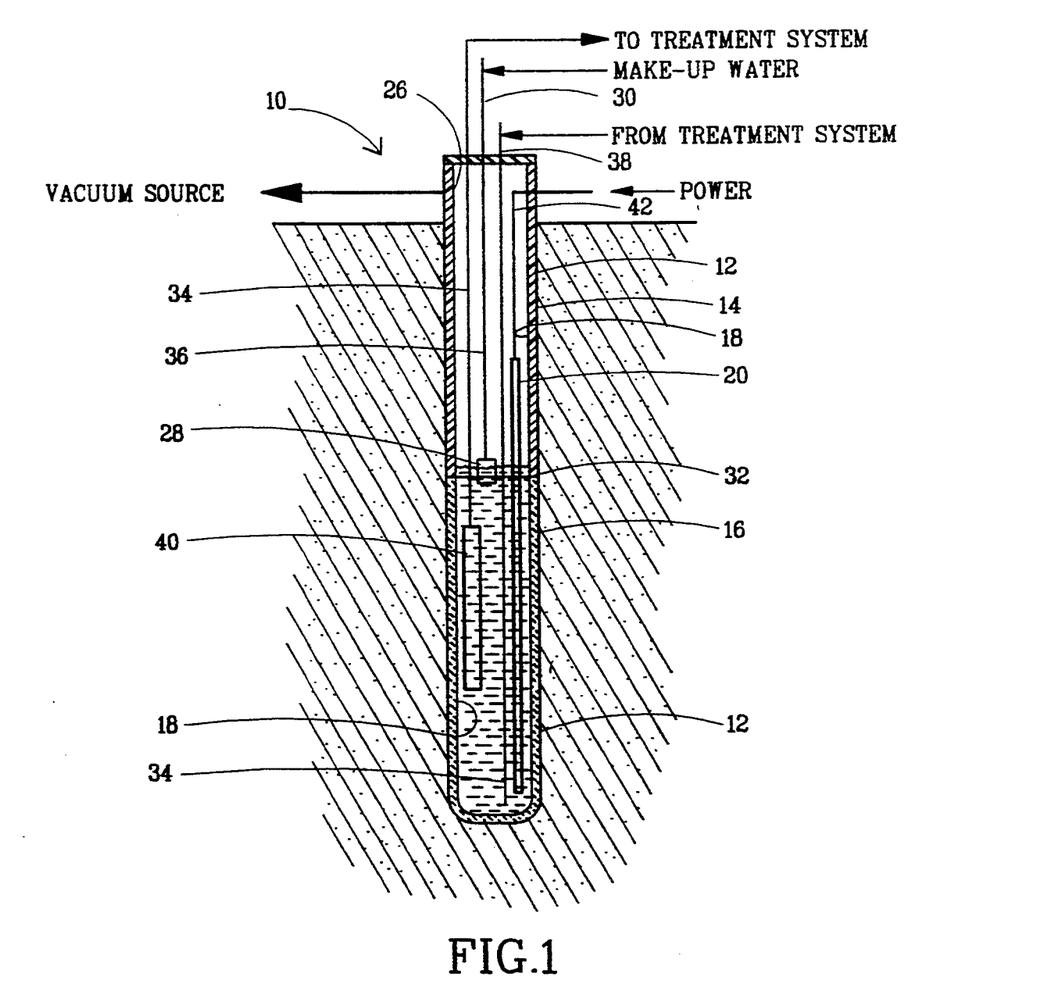
FIG. 1 is a diagrammatic sectional view of one form of electrode assembly illustrative of an embodiment of the invention.

Referring to FIG. 1, it will be seen that an illustrative electrokinetic electrode assembly 10, adapted for use at any depth, includes a substantially closed housing 12 including an upper well casing 14 of non-electrically conductive, water-impervious material, such as polyvinylchloride, or other plastics material, and a lower casing 16 of porous material capable of holding a vacuum, such as a ceramic material known in the art. Such a ceramic material found appropriate is known as "P3C", sold by Coors Ceramics Company of Golden, Colo. The upper and lower casings 14, 16 are fixed together to define a chamber 18 for retaining an electrolyte solution and pure water. By "pure water", it is intended to connote non-contaminated water without regard to the level or degree of "purity".

An electrode 20 is mounted at least partly in the lower casing 16. When it is intended that the electrode 20 serve as an anode, the electrode preferably is of iridium coated titanium. When it is intended that the electrode 20 serve as a cathode, the electrode preferably is of a material selected from a group consisting of copper, graphite, iron, steel and stainless steel.

The upper casing 14 of the electrode assembly 10 is provided with a vacuum orifice 26 by which a vacuum may be imposed selectively within the chamber 18 to control the flow of soil water through the porous lower casing 16 into the chamber 18 and to control outflow of the pure water, electrolyte solution, and any soil water therein, from the chamber 18.

A liquid level controller 28 preferably is disposed in the chamber 18 and is operative to admit pure water from an outside source of make-up water through a make-up water line 30. The liquid level controller 28 is adapted to sense the level of liquid in the housing 12 and, if the level is low, open the water line 30 to admit pure water to the chamber 18. The liquid in the chamber 18 comprises a mixture of pure water from the outside source of make-up water, the electrolyte solution, and any soil water collected in the housing 12. The liquid level controller preferably operates to maintain the liquid in the housing 12 at a level above a juncture 32 of the upper and lower casings 14. 16, to insure that the porous ceramic lower casing 16 is always filled and to prevent changes in internal pressure caused by level changes due to flows into or out of the casing 16.

Figure 2:
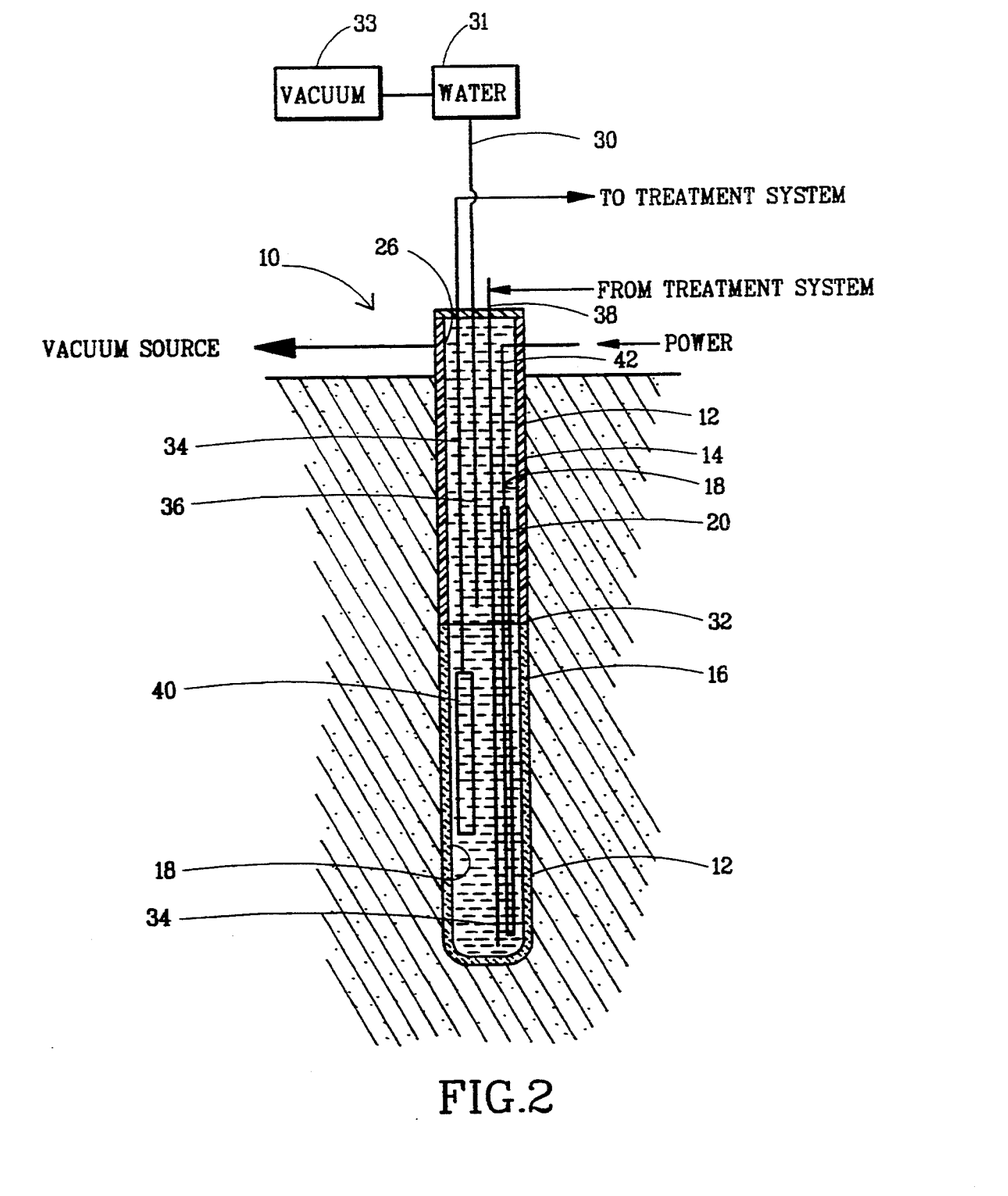
FIGS. 2 and 3 are similar to FIG. 1, but illustrative of alternative embodiments of electrode assembly.

For shallow depth applications, instead of the liquid level controller 28, an external source of pure water 31 (FIG. 2) may be used to gravity feed pure water to the electrode assembly 10, which is allowed to fill with liquid. In such instances, a vacuum source 33 is placed in communication with the water source 31 and vacuum in the water source 31 is used to counteract tree flow of water into the electrode assembly 10. The vacuum imposed on the water source 31 carries through the waiter line 30 into the chamber 18 to impose a vacuum on the chamber and restrain flow of liquid from the chamber 18 into the soil.

Conduit means 34 are provided for removing the liquid from the chamber 18 and for reintroducing the electrolyte solution to the chamber 18 after treatment of the solution. The electrolyte solution may be a buffering solution and the treatment of the solution may include pH and temperature adjustment. The conduit means 34 may comprise a single conduit used alternately for outflow of liquid and inflow of electrolyte. Alternatively, as shown in FIG. 1, the conduit means 34 comprises a first conduit 36 for removing the liquid from the chamber 18, and a second conduit 38 for reintroducing the electrolyte solution to the chamber. A pump 40 is provided in the lower casing 16 of the housing 12 and is operative to move the liquid through the first conduit 36.

A power line 42 is connected to the electrode 20 and to an external DC power source. The power line 42 transmits electrical power to the electrode 20 to energize the electrode.

The pump 40 continuously circulates the liquid around the electrode 20 to dislodge hydrolysis created gas bubbles collected on the electrode and maintains the liquid in the housing 12 in a substantially homogenous condition. The liquid level controller 28 maintains a constant liquid level in the housing to maintain a constant tension on the water.

Figure 3:
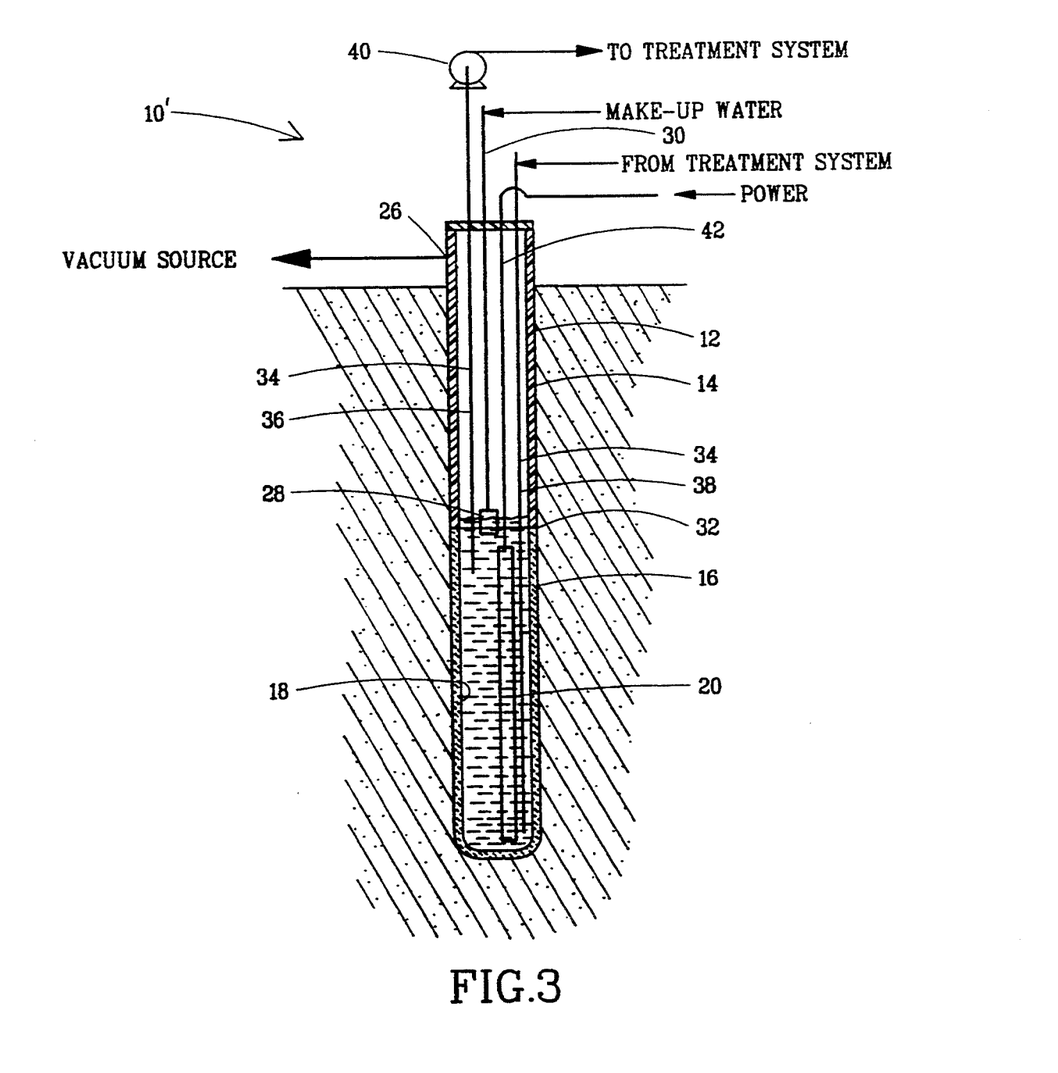

Referring to FIG. 3, it will be seen that an alternative embodiment of electrode assembly 10', also adapted for use at shallow depths, is in all respects similar to the electrode assembly 10 of FIG. 1, except that the pump 40 is disposed externally of the housing 12 and at ground surface level.

Figure 4:
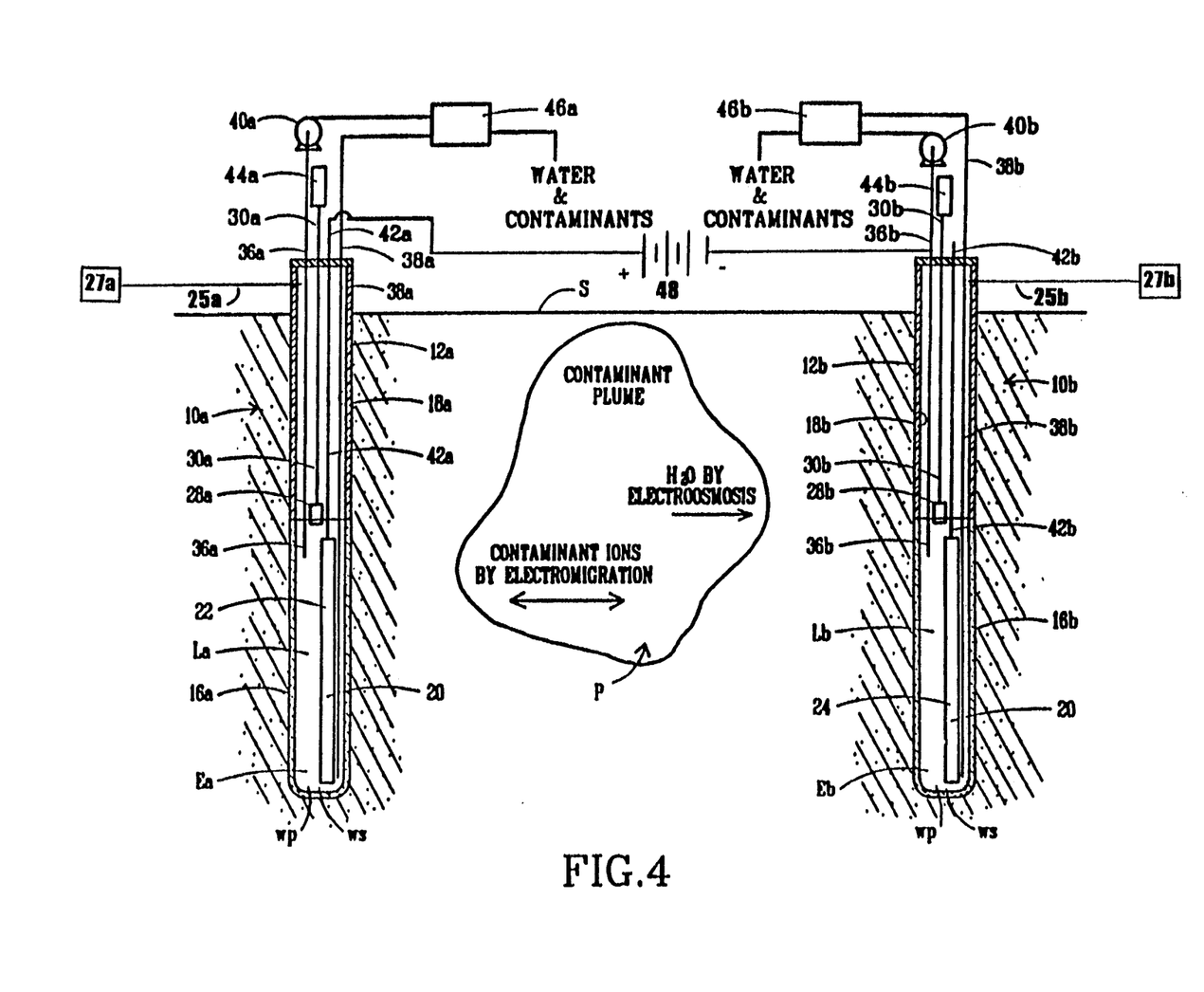
FIG. 4 is a diagrammatic representation of one form of electrode system utilizing electrode assemblies of the type shown in FIG. 3.

In FIG. 4 there is shown diagrammatically an illustrative electrode system utilizing at least two electrode assemblies 10a, 10b described above and shown (10') in FIG. 3. It will be appreciated that a system utilizing electrode assemblies 10 as shown in FIG. 1 would differ from the system shown in FIG. 4 only in that each of the assemblies 10 would have therein its own internal pump 40 rather than utilizing one or more pumps above ground, as illustrated in FIG. 3.

The electrode system of FIG. 4 is shown with two of the electrode assemblies 10a, 10b implanted in soil S having therein, in a vadose area, a contaminant plume P. While at least two electrodes (one positive, the other negative) are required for practice of the invention, it should be understood that the number of electrode assemblies 10 in accordance with this invention that are required may range from a low of one (with the other electrode being a plain metal electrode connected to a DC power source) to many.

The first electrode assembly 10a comprises a substantially closed first housing 12a, at least a part 16a of which is of porous material adapted to hold a vacuum. The housing 12a defines a first chamber 18a. A first electrolyte solution Ea and pure water Wp are disposed in the chamber 18a. (When in solution in the electrode assembly chamber, the electrolyte solution and water combined from simply a weaker electrolyte solution. However, inasmuch as the electrolyte solution and pure water Wp, and soil water Ws have different sources and are handled differently when taken from the chamber, for descriptive purposes they will be described as being different components of the liquid that resides in the chamber.) An anode 22 is mounted in the first chamber 18a.

A first vacuum line 25a is in communication with a first vacuum source 27a and with the first chamber 18a for effecting a selected first vacuum therein. Though not necessary in all electrode assemblies, as noted above, it is preferable to have a first liquid level controller 28a mounted in the first chamber 18a to admit the pure water Wp from an outside source 44a, by way of a first make-up water line 30a. A first outlet conduit 36a serves to remove a first liquid La from the chamber 18a. The liquid La includes the aforementioned combination of electrolyte solution Ea and pure water Wp and, in addition, any soil water Ws which may have entered the first assembly 10a. A pump 40a moves the liquid La through the first outlet conduit 36a, out of the housing 12a, and into a liquid treatment facility 46a, where water and contaminants may be separated and removed from the electrolyte solution, the pH and temperature of the electrolyte solution is adjusted, and the electrolyte solution Ea is returned to the assembly 10a. A first inlet conduit 38a serves to reintroduce the treated electrolyte Ea to the first chamber 18a.

As noted above with respect to the electrode assembly 10, the first outlet conduit 36a and first inlet conduit 38a may be replaced by a single conduit (not shown) serving both inlet and outlet functions alternately.

A first power line 42a places the anode 22 in electrical communication with the positive terminal of a direct current power source 48 disposed externally of the electrode assembly 10a.

Similarly, the second electrode assembly 10b includes a substantially closed second housing 12b, at least a part 16b of which is of porous material. The housing 12b defines a second chamber 18b. A second electrolyte solution Eb and pure water Wp are disposed in the second chamber 18b, along with any soil water Ws having entered the second chamber 18b.

A second vacuum line 25b is in communication with a discrete second vacuum source 27b and the second chamber 18b for effecting a selected second vacuum in the second chamber 18b. As in the first electrode assembly 10a, a liquid level controller 28b may be disposed in the second chamber 18b and operative to admit pure water from a second outside source 44b.

The second electrode assembly 10b is provided with the same arrangement of components for the same purposes, and operating in essentially the same manner as the first assembly. A second power line 42b places the cathode 24 in electrical communication with a negative terminal of direct current power source 48.

In operation, the anode 22 and cathode 24 are energized by direct current. The electrolyte solutions Ea, Eb, in the electrode assembly housings 12a, 12b, respectively, permit flow of electricity from the anode 22 to the cathode 24 through the porous portions 16a, 16b of the housings 12a, 12b, and through the contaminated soil S. Flow of electricity through the soil causes contaminant ions to migrate toward an electrode where they may be collected and removed. As noted hereinbefore, the direction and rate of contaminant movement is determined by factors such as type and concentration of contaminant, soil type and structure, interfacial chemistry of the soil-water system, and the current density in the soil pore water. The application of an electrical current to the soil also causes water to flow by electroosmosis in the soil pores toward one of the anode and cathode, usually the cathode 24. Such movement of water causes a depletion of soil moisture adjacent the anode and a collection of moisture near the cathode. In unsaturated soils, soil near the anode may be dried to the point of stopping conduction of electricity. Water is needed in the soil to support the electrical current, and this current is necessary to support electromigration of contaminant ions to at least one of the electrodes. Thus, while the movement of water towards the cathode possibly carries with it water-soluble contaminants which may be removed from the housing 12b by a pump 40b, the more pronounced path for decontamination usually lies in the electromigration of contaminant ions to one or both of the anode and the cathode.

To maintain the soil at a moisture level to support the flow of electricity to support the electromigration of contaminant ions through the soil, water is introduced into the anode housing 12a for passage through the porous portion 16a thereof. However, simply permitting water to flow unrestrained through the housing 12a and into the unsaturated soil may result in the water draining away, carrying water-soluble contaminants to deeper levels and enlarging the sphere of contamination.

By application of a vacuum to the anode housing 12a, the water therein is placed in tension and restrained in a selected degree from flowing into the soil. By application of a higher vacuum to the cathode housing 12b, a small and controlled amount of water is added to the soil from the anode housing 12a and extracted from the soil at the cathode housing 12b. The controlled addition of water to the soil prevents contamination from being transported by flowing water to greater depths. It will be apparent that in those instances in which soil water flows by electroosmosis toward the anode, the above-described applied vacuums are reversed.

Flow of contaminants in water by electroosmosis culminates in the contaminants entering the cathode housing 12b where the contaminated water, that is, the soil water Ws, mixes with the electrolyte Eb and the pure water Wp, to form the second liquid Lb in the second chamber 18b. The second liquid I,b is moved by the pump 40b, through the outlet conduit 36b, and into a second liquid treatment facility 46b, where it is cleansed to form electrolyte which is pH and temperature adjusted for flow through inlet conduit 38b to reenter the chamber 18b. Simultaneously, the level of the second liquid Lb is sensed by the liquid level controller 28b, which opens the water make-up line 30b to permit pure water Wp to enter the chamber 18b. When the flow of soil water is to the cathode housing 12b, more water will be pumped out of the cathode housing than is admitted to it.

Under certain site conditions, where contaminants are not expected to collect in the cathode housing, and where initial electric contact with the soil can be established, the cathode may be a bare electrode in direct contact with the soil, rather than the electrode assembly described herein. Again, in those instances in which soil water flows by electroosmosis toward the anode, the cathode must be an electrode assembly but the anode may be a bare electrode in direct contact with the soil.

The electromigration of contaminant ions to either or both electrodes 20 requires the removal of contaminants from the electrolyte solutions Ea, Eb, which is accomplished by the aforementioned removal of electrolyte for cleansing and pH and temperature adjustment. Nevertheless, contaminants may in due course collect on the electrodes and must be either disposed of along with the electrode, or removed from the electrode by acid leaching, whereupon the electrode may be returned to service.

Figure 5:
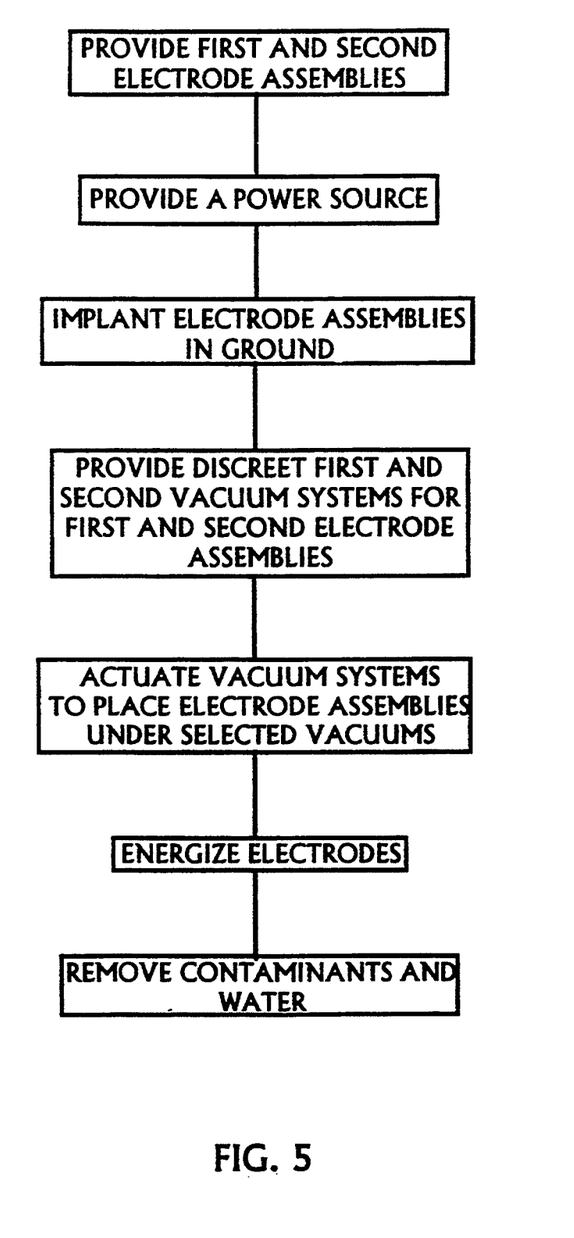
FIG. 5 is a block diagram illustrating a method for extraction of soil contaminants utilizing a system as shown in FIG. 3.

To utilize the above-described electrode assemblies and system in removal of contaminants from unsaturated soil in situ, as illustrated in FIG. 5, the first and second electrode assemblies 10a, 10b are implanted in the affected ground area and spaced from each other. The discrete first and second vacuum sources 27a, 27b for the first and second housings 12a, 12b, respectively, are provided. Electrolyte is placed in the housings to a point above the porous portions and the first and second vacuum sources 27a, 27b are actuated to place the first and second electrode assemblies 10a, 10b under selected first and second vacuums to control movement of water from the first electrode assembly 10a into the soil and from the soil into the second electrode assembly 10b. The anode 22 and the cathode 24 are then energized with direct current from the power source 48 to induce flow of soil water, usually from the anode 22 to the cathode 24, and to induce migration of contaminant ions to at least one of the anode and cathode. Contaminant and water may be removed from each electrode assembly by replacing the removed portions with pure water.

The operator may selectively apply a lower vacuum to the first electrode assembly 10a than to the second electrode assembly 10b, to permit a controlled amount of water to be added to the soil by the first electrode assembly and extracted from the soil by the second electrode assembly.

In one particular embodiment of the invention, the porous lower portion 16 of electrode assembly 10 is on the order of 2 meters long. The internal components such as electrode 20 and pump 40 are suspended from a flanged top on housing 12 so that they may be removed for servicing without disturbing housing 12, which typically may be placed about 5 meter below ground level for examination of a contaminated site extending from 3 to 6 meters below ground level.

There is thus provided a system and method by which an electric current is passed through contaminated soil in situ, causing contaminant ions to migrate toward an electrode from whence they are collected and removed. Water is held under tension inside the electrode assembly by applied selected vacuums which controllably limit the degree of attainable saturation of the soil. The system increases the moisture content of the soil, but only to a limited and controllable extent. While electromigration is the principal mechanism for moving contaminants, electroosmosis plays an important role in increasing the soil moisture to optimal levels for electromigration and a lesser role in carrying some water soluble contaminants into the cathode housing.

It is to be understood that the present invention is by no means limited to the particular construction herein disclosed and/or shown in the drawings, but also comprises any modifications or equivalents within the scope of the claims.

Having thus described our invention, what we claim as new and desire to secure by Letters Patent of the United States is:

1. A method for removal of contaminants from unsaturated soil in situ, said method comprising the steps of:
   implanting first and second electrode assemblies in unsaturated soil and spaced from each other, each electrode assembly comprising a housing, at least a portion of each housing being capable of holding a vacuum and porous, said portion of each housing containing an electrolyte;
   providing discrete first and second vacuum sources for said first and second housings;
   actuating said first and second vacuum sources to place said first and second electrode assemblies under selected first and second vacuums to control movement of liquid through said portions from one of said first and second electrode assemblies into said soil and from said soil into the other of said first and second electrode assemblies, respectively; and
   energizing said electrodes with direct current to induce flow of soil water from one of said anode and said cathode toward the other of said anode and said cathode, and to induce migration of contaminant ions to at least one of said anode and said cathode.

2. The method in accordance with claim 1 including the further step of circulating liquid around said anode and said cathode to remove water hydrolysis created gas bubbles collected thereon and to maintain said liquid in a substantially homogenous condition.

3. The method in accordance with claim 1 including the further steps of treating said liquid to remove contaminants therein from said liquid.

4. The method in accordance with claim 1 wherein said first selected vacuum applied to said one of said first and second electrode assemblies is lower than said second selected vacuum applied to said other of said first and second electrode assemblies, to permit a controlled amount of water to be added to said soil by said one electrode assembly and extracted from said soil by said other electrode assembly.

5. A method for removal of contaminants from unsaturated soil in situ, said method comprising the steps of:
   implanting first and second electrode assemblies in unsaturated soil and spaced from each other, at least one of said assemblies comprising a housing, at least a portion of each housing being capable of holding a vacuum and porous, said portion of each housing containing an electrolyte;

controlling movement of liquid in either direction through said porous portion, the liquid including either the electrolyte or soil water; and energizing said electrodes with direct current to induce flow of soil water from one of said anode and said cathode toward the other of said anode and said cathode, and to induce migration of contaminant ions to at least one of said anode and said cathode.

6. The method of claim 5 wherein each of said first and second electrode comprise said housing.

7. The method of claim 6 wherein the lower portion of each housing is porous and the upper portion of each housing is not porous, and liquid fills the porous portion of said housing, the movement of liquid is controlled by adjusting the atmospheric pressure in the upper portion of the housing.

8. The method of claim 7 including treating the liquid in the porous portion to remove contaminants.

9. The method of claim 7 wherein the step of treating the liquid includes moving the liquid through a conduit to a treatment location, and replacing the removed liquid with uncontaminated electrolyte.

* * * * *